(12) United States Patent
Abke

(10) Patent No.: US 10,864,959 B2
(45) Date of Patent: Dec. 15, 2020

(54) VEHICLE AND RELATED CONTROL SYSTEM

(71) Applicant: Honda Motor Co., Ltd., Tokyo (JP)

(72) Inventor: Timothy A. Abke, Zanesfield, OH (US)

(73) Assignee: Honda Motor Co., Ltd., Tokyo (JP)

( * ) Notice: Subject to any disclaimer, the term of this patent is extended or adjusted under 35 U.S.C. 154(b) by 407 days.

(21) Appl. No.: 15/790,625

(22) Filed: Oct. 23, 2017

(65) Prior Publication Data
US 2019/0118895 A1 Apr. 25, 2019

(51) Int. Cl.
*B62K 11/00* (2006.01)
*B62D 21/18* (2006.01)
*B62D 15/00* (2006.01)
*B62D 61/02* (2006.01)
*B60T 1/00* (2006.01)
*B60B 19/00* (2006.01)

(52) U.S. Cl.
CPC .............. *B62K 11/00* (2013.01); *B60B 19/00* (2013.01); *B60T 1/00* (2013.01); *B62D 15/00* (2013.01); *B62D 21/18* (2013.01); *B62D 61/02* (2013.01)

(58) Field of Classification Search
CPC ........... B62K 11/00; B60B 19/00; B60T 1/00; B62D 15/00; B62D 21/18; B62D 61/02
See application file for complete search history.

(56) References Cited

U.S. PATENT DOCUMENTS

| | | | | |
|---|---|---|---|---|
| 1,608,512 A | * | 11/1926 | Kent ...................... | B62D 61/02 296/156 |
| 1,989,573 A | * | 1/1935 | Von Loutzkoy ....... | B62D 61/02 280/29 |
| 3,390,863 A | * | 7/1968 | Schenck ............... | A01G 23/003 104/118 |
| 3,487,867 A | * | 1/1970 | Schenck ............... | A01G 23/006 152/47 |
| 3,565,200 A | * | 2/1971 | Siewert ................. | B62D 53/02 180/224 |
| 3,640,192 A | * | 2/1972 | Mauldin ............... | E01C 19/266 404/122 |
| 3,763,944 A | * | 10/1973 | Kaltenegger ......... | B62D 11/10 180/6.2 |

(Continued)

FOREIGN PATENT DOCUMENTS

| | | |
|---|---|---|
| DE | 102007026610 | 1/2009 |
| JP | S58156401 | 9/1983 |
| WO | 2017046468 | 3/2017 |

OTHER PUBLICATIONS

International Search Report and Written Opinion of PCT U.S. Appl. No. PCT/US2018/048292 dated Nov. 7, 2018, 7 pages.

*Primary Examiner* — Behrang Badii
*Assistant Examiner* — Daniel L Greene
(74) *Attorney, Agent, or Firm* — Rankin, Hill & Clark LLP

(57) ABSTRACT

A vehicle includes a frame including a front frame part and a rear frame part. A single front wheel is rotatably connected to the front frame part. A single rear wheel is rotatably connected to the rear frame part. Each of the front wheel and the rear wheel is adapted to have a cylindrical shape in top view when the vehicle is traveling in a straight direction, and at least one of the front wheel and the rear wheel is adapted to expand and have a frustoconical shape in top view in a turning condition of the vehicle.

15 Claims, 6 Drawing Sheets

(56) References Cited

U.S. PATENT DOCUMENTS

| | | | | |
|---|---|---|---|---|
| 3,802,743 | A * | 4/1974 | Hermanns | B60B 25/02 301/5.1 |
| 3,814,531 | A * | 6/1974 | Carnahan | B62D 53/02 404/117 |
| 4,046,485 | A * | 9/1977 | Dermond | E01C 19/26 404/123 |
| 4,081,048 | A * | 3/1978 | Hendricks | B62M 13/02 180/206.3 |
| 4,357,893 | A * | 11/1982 | Frye | B60F 3/0069 114/288 |
| 4,589,460 | A | 5/1986 | Albee | |
| 4,648,853 | A * | 3/1987 | Siegfried | A63H 17/262 180/7.1 |
| 4,657,272 | A * | 4/1987 | Davenport | B62K 5/02 280/266 |
| 4,733,742 | A * | 3/1988 | Frye | B62D 7/14 180/223 |
| 4,739,810 | A | 4/1988 | Markow | |
| 4,752,986 | A * | 6/1988 | Rivkin | B60B 33/0021 16/18 A |
| 4,773,889 | A * | 9/1988 | Rosenwinkel | A63H 17/262 152/454 |
| 4,844,492 | A * | 7/1989 | Ludwig | A63C 17/064 280/11.227 |
| 4,906,051 | A * | 3/1990 | Vilhauer, Jr. | B60B 15/12 301/38.1 |
| 5,178,088 | A * | 1/1993 | Howard | B60F 3/0069 440/100 |
| 5,246,403 | A * | 9/1993 | Uphaus | F16H 9/14 474/117 |
| 5,593,520 | A * | 1/1997 | Boni | B60C 17/06 152/158 |
| 5,839,795 | A | 11/1998 | Matsuda et al. | |
| 6,343,803 | B1 * | 2/2002 | Johnston | A63C 17/01 280/11.27 |
| 6,568,695 | B2 * | 5/2003 | Dornan | A63C 5/035 280/11.227 |
| 6,860,346 | B2 * | 3/2005 | Burt | B60B 15/00 180/218 |
| 7,448,421 | B2 * | 11/2008 | Kahen | B60B 15/18 152/216 |
| 7,837,204 | B1 * | 11/2010 | Groenenboom | A63C 17/0093 280/11.27 |
| 7,850,252 | B2 * | 12/2010 | Mills | B60B 15/025 301/40.1 |
| 8,544,572 | B2 * | 10/2013 | Furuta | B62K 1/00 180/8.3 |
| 8,678,520 | B2 | 3/2014 | Sheu et al. | |
| 9,415,631 | B2 * | 8/2016 | Lee | B60B 19/04 |
| 9,744,804 | B2 * | 8/2017 | Pope | B60B 11/06 |
| 10,040,502 | B2 * | 8/2018 | Loveland | B62K 17/00 |
| 2002/0036104 | A1 * | 3/2002 | Kerrebrock | B25J 9/08 180/6.2 |
| 2003/0011157 | A1 * | 1/2003 | Aubarede | B60G 3/26 280/86.751 |
| 2003/0071513 | A1 * | 4/2003 | Elkow | B60C 5/22 301/13.1 |
| 2003/0071515 | A1 * | 4/2003 | Elkow | B60C 5/22 301/36.1 |
| 2004/0047686 | A1 * | 3/2004 | Kitko | E01C 19/285 404/128 |
| 2004/0062608 | A1 * | 4/2004 | Auf der Springe | E01C 19/26 404/122 |
| 2005/0045398 | A1 * | 3/2005 | Suzuki | B62D 61/02 180/209 |
| 2007/0017717 | A1 | 1/2007 | Kuper et al. | |
| 2010/0320706 | A1 | 12/2010 | Horiguchi et al. | |
| 2012/0155961 | A1 * | 6/2012 | Norton | E01C 19/26 404/75 |
| 2013/0054126 | A1 * | 2/2013 | Lazzari | B62D 37/06 701/124 |
| 2014/0117746 | A1 * | 5/2014 | Pope | B60B 11/06 301/35.628 |
| 2015/0153167 | A1 * | 6/2015 | Nakamura | G01C 9/06 356/600 |

\* cited by examiner

US 10,864,959 B2

VEHICLE AND RELATED CONTROL SYSTEM

BACKGROUND

The subject matter disclosed herein relates to a vehicle and a related control system, and more particularly, to a vehicle having a front wheel and a rear wheel, wherein at least one of the front wheel and rear wheel is configured to change its shape during a turning condition of the vehicle.

BRIEF DESCRIPTION

According to one aspect, a vehicle comprises a frame including a front frame part and a rear frame part separate from and pivotably connected to the front frame part. A single front wheel is rotatably connected to the front frame part. A single rear wheel is rotatably connected to the rear frame part. Each of the front wheel and the rear wheel is adapted to have a cylindrical shape in top view when the vehicle is traveling in a straight direction, and at least one of the front wheel and the rear wheel is adapted to expand and have a frustoconical shape in top view in a turning condition of the vehicle.

According to another aspect, a control device is provided for a vehicle having a single front wheel rotatably connected to a front frame part and a single rear wheel rotatably connected to a rear frame part. The control device comprises a detecting section that detects a turning condition of the vehicle; a first determining section that, when the turning condition is detected, determines a rate of turn and a degree of turn; a second determining section that determines operational conditions of the vehicle; and an adjusting section that, when the rate and degree of turn is determined by the first determining section and when the operational conditions of the vehicle are determined by the second determining section, actuates one of a front wheel expansion device and a rear expansion device housed within the respective front wheel and rear wheel to selectively expand the respective one of the front wheel and rear wheel to change a shape of the respective one of the front wheel and rear wheel from a cylindrical shape in top view to a frustoconical shape in top view.

According to another aspect, a method of controlling a vehicle is provided. The vehicle has a single front wheel rotatably connected to a front frame part and a single rear wheel rotatably connected to a rear frame part. The method comprises detecting a turning condition of the vehicle; determining a rate of turn and a degree of turn associated with the detected turning condition of the vehicle; determining operational conditions of the vehicle; and when the rate and degree of turn is determined by the first determining section and when the operational conditions of the vehicle are determined by the second determining section, actuating one of a front wheel expansion device and a rear expansion device housed within the respective front wheel and rear wheel to selectively expand the respective one of the front wheel and rear wheel to change a shape of the respective one of the front wheel and rear wheel from a cylindrical shape in top view to a frustoconical shape in top view.

DETAILED DESCRIPTION

It should, of course, be understood that the description and drawings herein are merely illustrative and that various modifications and changes can be made in the structures disclosed without departing from the present disclosure. For purposes of understanding, the term "signal" utilized herein is defined as any electrical signal or any stored or transmitted value. For example, a signal can comprise a voltage, or a current. Further, a signal can comprise any stored or transmitted value such as binary values, scalar values, or the like.

Figure 1:
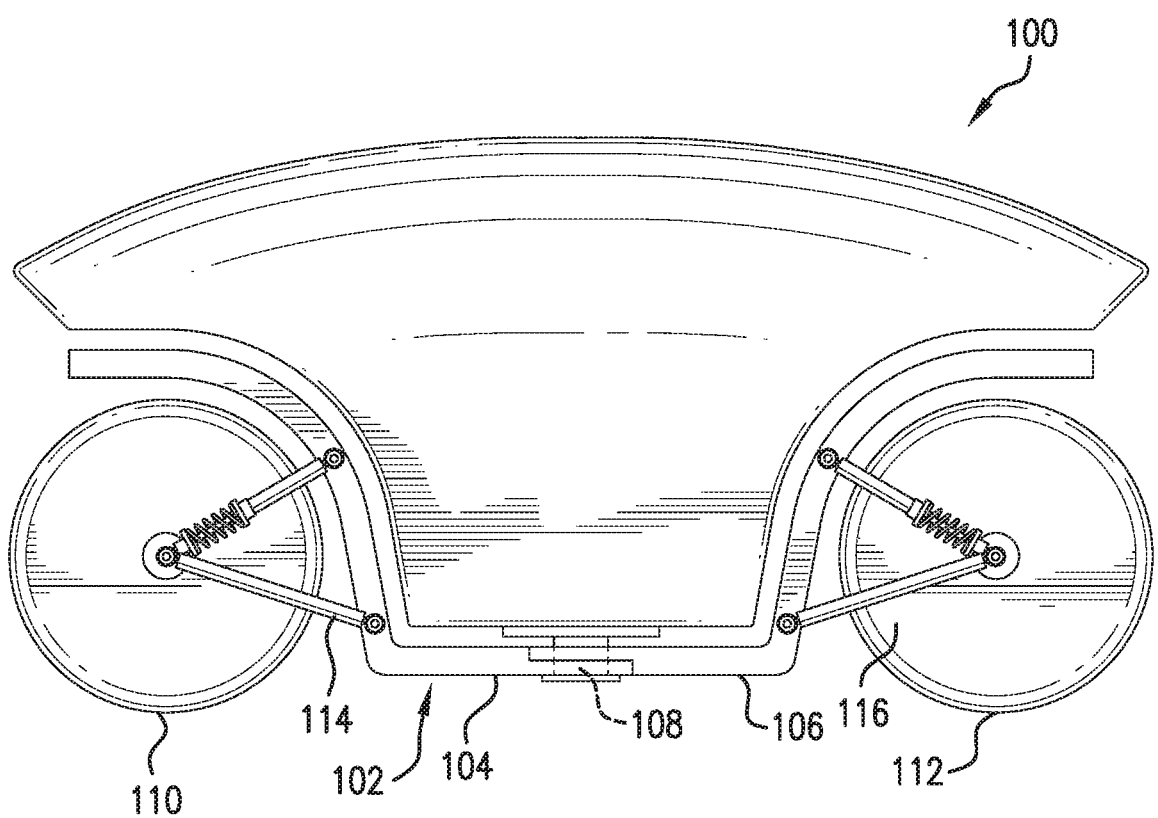
FIGS. 1 and 2 are schematic views of a vehicle according to one aspect of the present disclosure.
Figure 2:
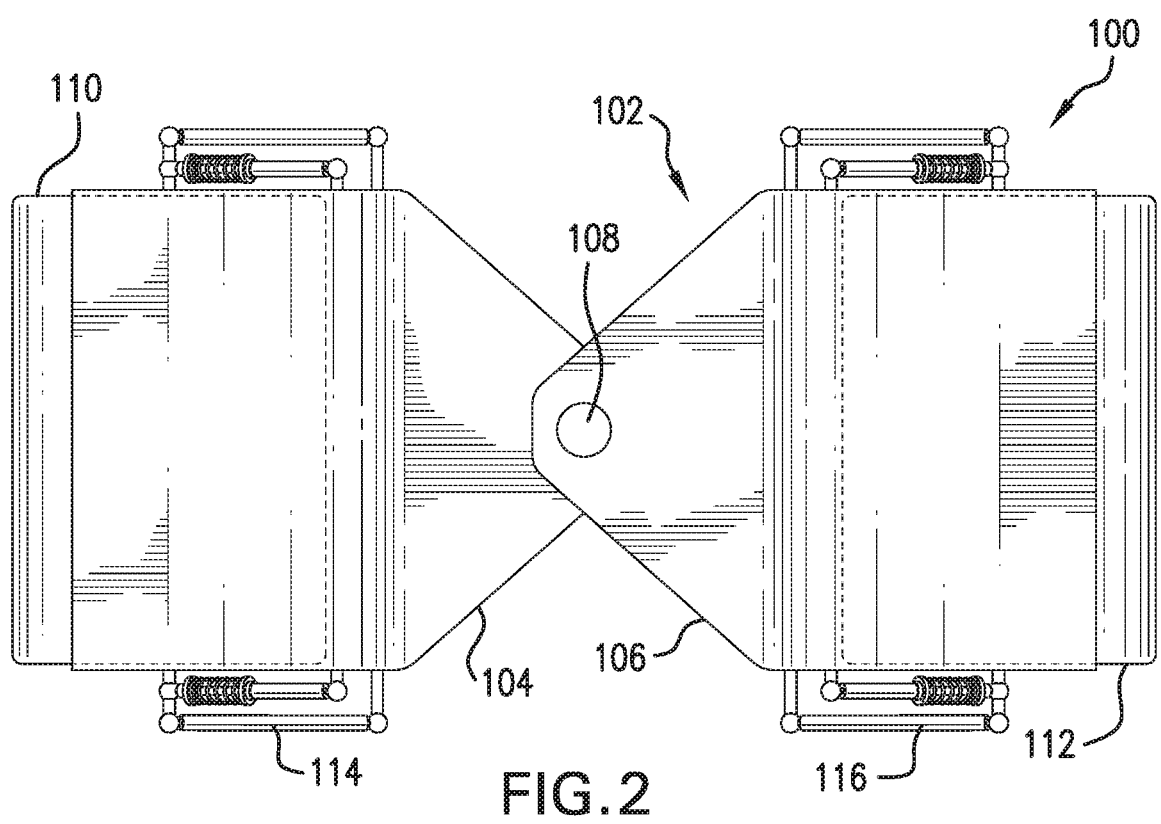
Figure 3:
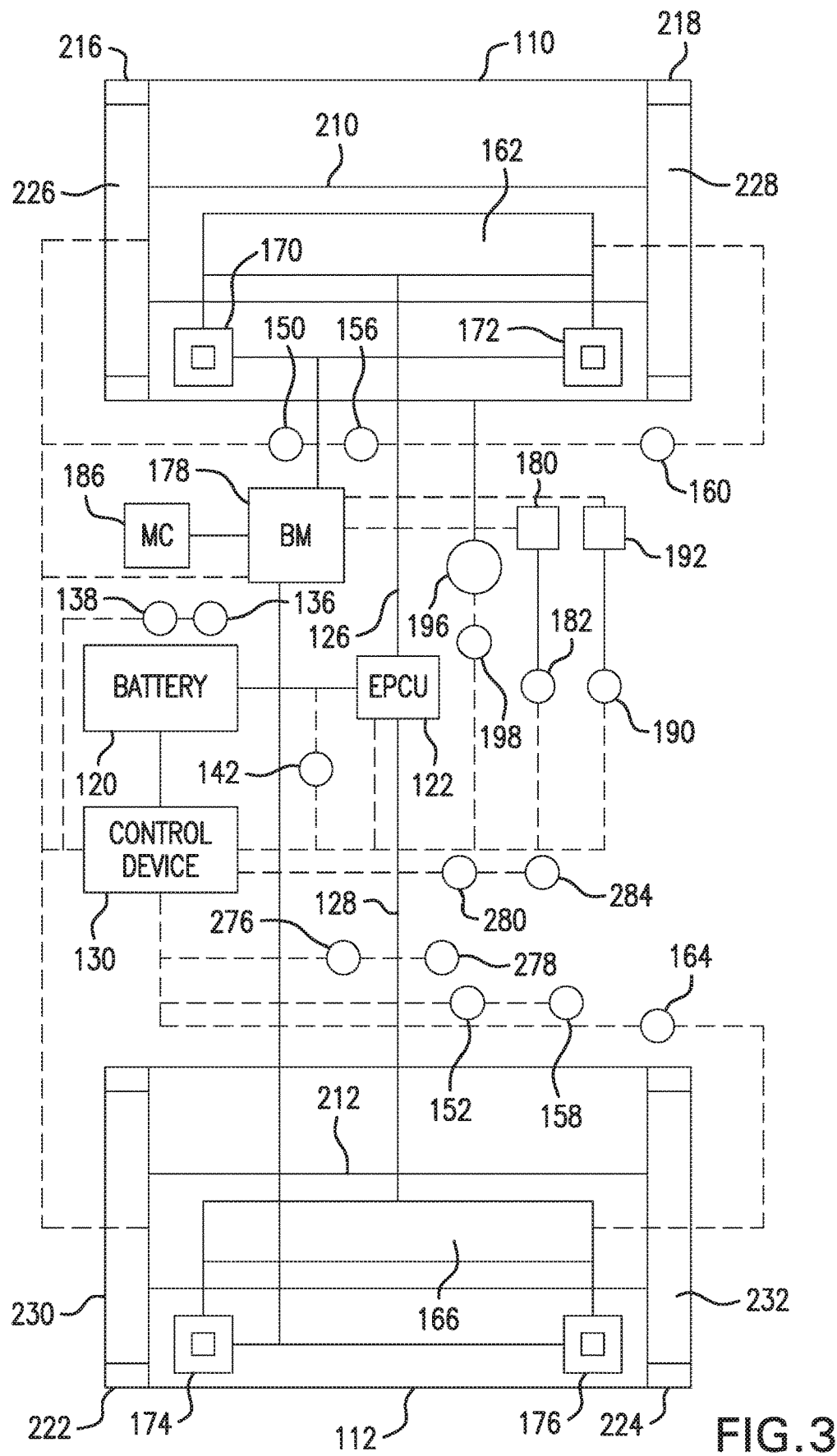
FIG. 3 is schematic illustration of the vehicle including exemplary vehicle control systems according to the present disclosure.

Referring now to the drawings, wherein like numerals refer to like parts throughout the several views, FIGS. 1-3 schematically illustrate a vehicle 100 according to one aspect of the present disclosure. The vehicle 100 generally comprises a frame 102 including a front frame part 104 and a rear frame part 106. In the depicted embodiment, the rear frame part 106 is separate from the front frame part 104 and is pivotably connected to the front frame part 104, for example, at a single pivot structure 108 (therefore, the front frame part 104 and the rear frame part 106 are connected at a single pivot point). A single front wheel 110 is rotatably connected to the front frame part 104, and a single rear wheel 112 is rotatably connected to the rear frame part 106. As will be described below, each of the front wheel 110 and the rear wheel 112 is adapted to have a cylindrical shape in top view when the vehicle 100 is traveling in a straight direction, and at least one of the front wheel 110 and the rear wheel 112 is adapted to expand and have a frustoconical shape in top view in a turning condition of the vehicle (see FIGS. 6 and 7 which depict an embodiment wherein each of the front wheel 110 and the rear wheel 112 is adapted to have a frustoconical shape in top view in a turning condition of the vehicle 100). Front and rear suspension devices 114, 116 suspend the respective front and rear wheels 110, 112 on the frame 102. The vehicle 100 further includes a battery 120 and electrically connected to front and rear drive motors 162, 166 housed within the front and rear wheels 110, 112. The battery 120 is connected to an electric power control unit 122 which selectively distributes a driving force of the battery 120 to the front drive motor 162 via a front drive power line/cable 126 and to the rear drive motor 166 via a rear drive power line/cable 128.

As is well known, a vehicle control device 130 can control the driving force distributed to the front wheel 110 and the rear wheel 112 by selectively connecting the electric power control unit 122 to the front drive power line/cable 126 and the rear drive power line/cable 128. The control device 130 can further control the front and rear drive motors 162, 166, and can receive a detection signal of drive motor power detected by a drive motor power sensor device 136, a detection signal of drive motor speed detected by a drive motor speed sensor device 138, and a detection signal of drive motor torque from a drive motor torque sensor device 142. It should be appreciated that each of the sensor devices 136, 138, 142 can include a processing circuit (not shown) that processes the results of detection and outputs the processed results to the control device 130.

The control device 130 can further have a brake traction control system function that prevents wheel slip in acceleration, and a side-slip prevention system function that works when the vehicle turns. With the brake traction control system function when terrain surface friction is different for the front and rear wheels 110, 112, brake control is applied to the wheel on the low friction side while drive motor torque is supplied to the wheel on the high-friction side, thus obtaining all wheel traction. To aid in brake control, front and rear ground contact sensor devices 150, 152 and front and rear ground angle sensor devices 156, 158 are in signal communication with the control device 130. The front and rear ground contact force sensor devices 150, 152 detect ground contact forces that occur between the each of the respective front and rear wheels 110, 112 and a road surface. Each of the front and rear ground contact force sensor devices 150, 152 includes an output circuit (not shown) that processes the results of detection and outputs the results to the control device 130. The control device 130 is able to obtain the ground contact forces on the front and rear wheels 110, 112 based on the results output from the ground contact force sensor devices 150, 152. The front and rear ground angle sensor devices 156, 158 measure the attitude (inclination, or the like) of the vehicle 100 with respect to a road surface. Each of the front and rear ground angle sensor devices 156, 158 includes an output circuit (not shown) that processes the measurement results and outputs the results to the control device 130. The control device can also have an anti-lock braking system function that prevents wheel lock by performing anti-lock control on the front and rear wheels 110, 112 when braking is applied.

Still further, the exemplary vehicle 100 includes a front wheel speed sensor device 160 that detects the wheel speed of the front wheel 110, and a rear wheel speed sensor device 164 that detects the wheel speed of the rear wheel 112. The front and rear wheel speed sensor devices 160, 164 are in signal communication with the control device 130. Each of the front and rear wheel speed sensor devices can include a processing circuit (not shown) that processes the results of detection and outputs the processed results to the control device 130. The control device 130 is able to obtain the rotational speeds of the front and rear wheels 110, 112 based on the results output from the front and rear wheel speed sensor devices 160, 164.

The vehicle 100 is further provided with a brake system including front wheel brakes 170, 172 for the front wheel 110 and rear wheel brakes 174, 176 for the rear wheel 112. The brake system further includes a brake modulator 178 (e.g., a brake control or regulatory valve), a manual brake switch or actuator 180 (i.e., brake pedal), a brake sensor device 182, and a master brake cylinder 186 (which is operably connected to the brake modulator 178). The brake pedal sensor device 182 is a device for detecting the depressed state of the brake pedal 180 and for outputting the detection results to the control device 130, and can include an angle sensor (not shown) that detects the depression amount of the brake pedal 180 and a processing circuit (not shown) that processes the results of detection by the angle sensor and outputs the processed results to the control device 130. The control device 130 is able to calculate the brake depression amount from the results of detection (the depression amount of the brake pedal 180) by the brake pedal sensor device 182. The brake sensor device 182 is also adapted to provide a signal indicating whether the front and rear vehicle brakes are in an engaged or disengaged condition (i.e., whether the manual brake actuator 180 is actuated or released) and is further adapted to provide a signal indicative of a master brake cylinder pressure. As is well known, the front and rear wheel brakes are operated by pressurized fluid such as air or a suitable brake fluid that is conveyed under pressure from the master brake cylinder 186 to the brakes. The brake system of the exemplary vehicle 100 can be controlled by the control device 130.

Still further, the vehicle 100 is provided with an accelerator pedal sensor device 190 for detecting angular displacement of an acceleration switch or actuator 192 (i.e., accelerator pedal). The acceleration pedal sensor device 190 detects the depressed state of the accelerator pedal 192 and outputs the detection results to the control device 130. The accelerator pedal sensor device 190 can include an angle sensor (not shown) that detects the depression amount of the accelerator pedal 192 and a processing circuit (not shown) that processes the results of detection by the angle sensor and outputs the processed results to the control device 130. The control device 130 is able to calculate the accelerator opening degree from the results of detection (the depression amount of the accelerator pedal 192) by the accelerator pedal sensor device 190. When a driver operates the accelerator pedal 192, power is applied from the battery 120 to at least one of the front and rear drive motors 162, 166, and at least one of the front and rear wheels 110, 112 is driven for rotation at a rotational speed corresponding to a depressed state of the accelerator pedal 192.

A steering device 196 (i.e., steering wheel) is operably connected to the front wheel 110. A steering sensor device 198 detects the operated state of the steering device 196 and outputs the detection results to the control device 130. The steering sensor device 198 can include an angle sensor (not shown) that detects the rotation angle of the steering device 196 associated with the rotation direction and a processing circuit (not shown) that processes the results of detection by the angle sensor and outputs the processed results to the control device 130. The steering sensor device 198 measures the steering wheel position angle and rate of turn.

Figure 4:
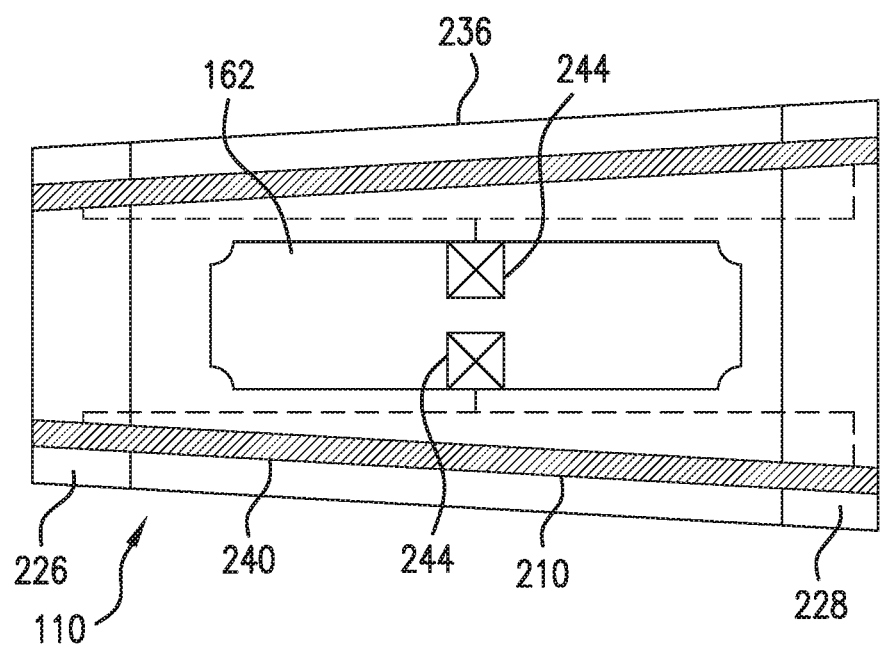
FIG. 4 is a schematic view of an expansion device housed in one of a front wheel and rear wheel of the vehicle.

FIG. 3 schematically depicts the front wheel 110 configured to house a front expansion device 210 and the rear wheel 112 configured to house a rear expansion device 212. The front expansion device 210 is adapted to selectively expand one of the opposite end portions 216, 218 of the front wheel 110 based on the turning direction of the vehicle, and the rear expansion device 212 is adapted to selectively expand one of the opposite end portions 222, 224 of the rear wheel 112 based on the turning direction of the vehicle. According to one embodiment, the front wheel 110 includes laterally spaced front expandable elements 226, 228, and the front expansion device 210 is configured to selectively expand one of the front expandable elements 226, 228. Similarly, the rear wheel 112 include laterally spaced rear expandable elements 230, 232, and the rear expansion device 212 is configured to selectively expand one of the rear expandable elements 230, 232. With reference to FIG. 4, according to one aspect, the front expandable elements 226, 228 can be composed of highly elastic tire elements that are expandable via the front expansion device 210; although, alternative configurations for the front expandable elements are contemplated. The front tire 110 can include an outer skin 236 formed of an elastic polymeric material (e.g., rubber) that interconnects the front expandable elements 226, 228. It should be appreciated that the rear wheel 112 can be similarly constructed.

According to one embodiment, one of the front expansion device 210 and rear expansion device 212 is an expansion mandrel provided with at least one actuator adapted to selectively expand opposite end portions of the mandrel, and, in turn, the respective front expandable elements 226, 228 and rear expandable elements 230, 232. In FIG. 4, the front expansion device 210 is an expansion mandrel 240 that is configured to expand and adjust a shape of the front tire 110 from a cylindrical shape in top view to a frustoconical shape in top view in a turning condition of the vehicle 100. As shown, the expansion mandrel 240 can include at least one actuator 244, and a control circuit (not shown) that controls the at least one actuator 244 based on a command from the control device 130. As the control circuit of the expansion mandrel 240 controls driving of the at least one actuator 244 based on a command from the control device 130, the at least one actuator 244 is driven to expand one of the end portions of the expansion mandrel 240 (and, in turn, one of the front expandable elements 226, 228 of the front tire 110). The control circuit of the expansion mandrel 240 can monitor the expansion amount by a sensor (not shown) and output the detected expansion amount to the control device 130. The control circuit of the expansion mandrel 240 stops driving of the at least one actuator 244 as instructed by the control device 130. It should be appreciated that the rear expansion device 212 can be similarly constructed.

Figure 8:
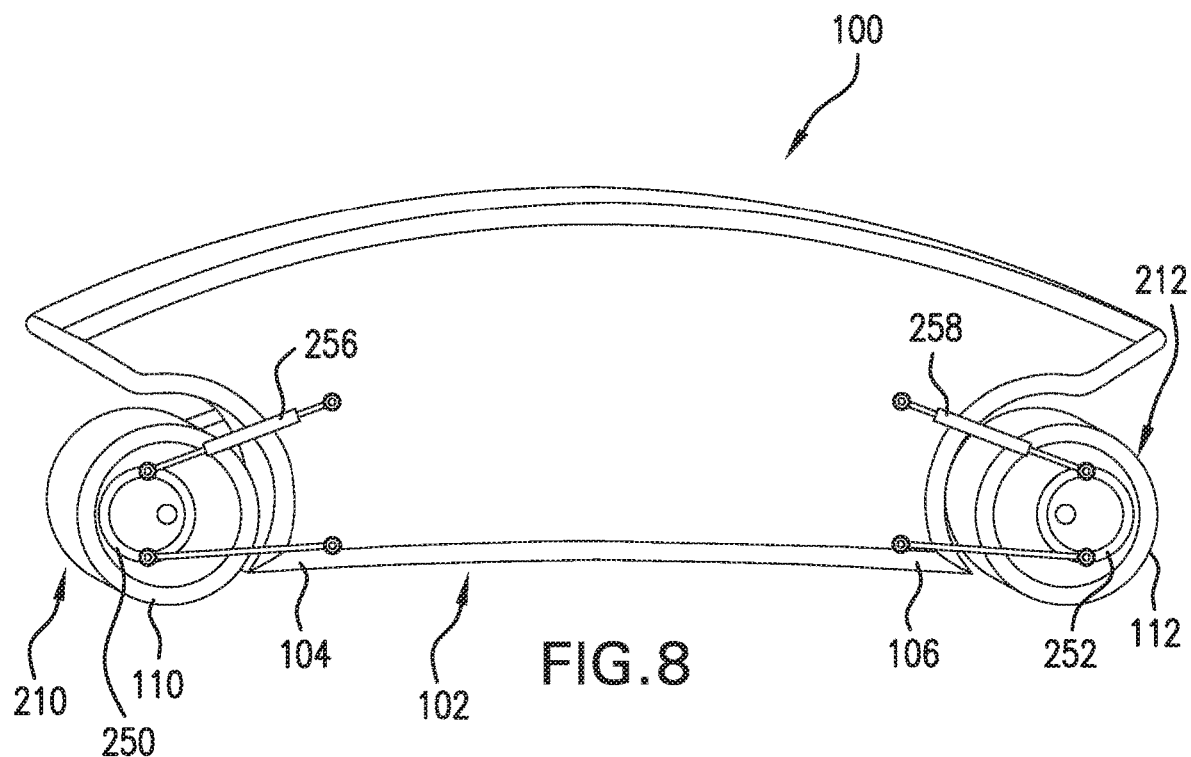
FIGS. 8 and 9 are schematic views of a vehicle according to another aspect of the present disclosure.
Figure 9:
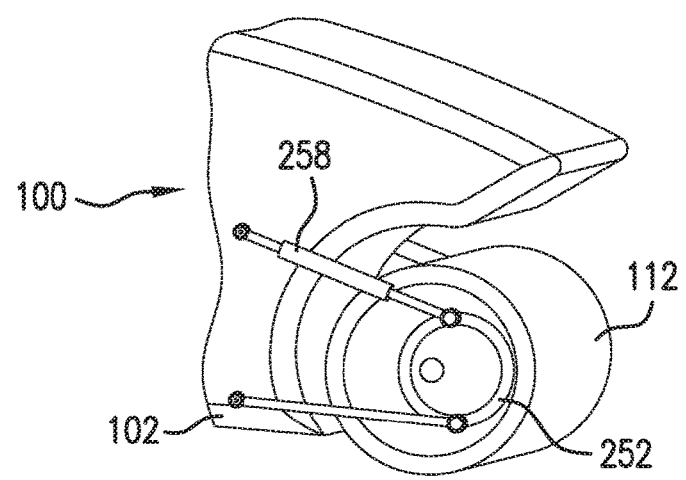

FIGS. 8 and 9 schematically depict another aspect of one of the front expansion device 210 and the rear expansion device 212. According to this embodiment, the vehicle frame 102 includes the front frame part 104 and the rear frame part 106, but the rear frame part 106 is not separate from the front frame part 104 like in FIGS. 1 and 2. In contrast to the expansion mandrel 240, one of the front expansion device 210 and rear expansion device 214 includes rotary eccentric cams provided at the opposite end portions of the respective one of the front wheel 110 and rear wheel 112. More particularly, the front expansion devices 210 includes first rotary eccentric cams 250 provided at its end portions 216, 218, and the rear expansion device 212 includes second rotary eccentric cams 252 provided at its end portions 222, 224. Rotational axes of the first rotary eccentric cams 250 are coaxial with a rotational axis of the front wheel 110, and rotation of each first rotary eccentric cam 250 selectively expands one of the front expandable elements 226, 228 based on the turning direction of the vehicle 100. Front linear actuators 256 can be operably connected to the first rotary eccentric cams 250 to independently rotate each first rotary eccentric cam 250. Each front linear actuator 256 can include a control circuit (not shown) that controls the front linear actuator 256 based on a command from the control device 130. The control circuit can monitor the extension/retraction amount of the front linear actuator 256 by an extension/retraction sensor (not shown) and output the detected extension/retraction amount to the control device 130. The control circuit stops the extension/retraction of the front linear actuator 256 as instructed by the control device 130. Similarly, regarding the rear expansion device 212, rotational axes of the second rotary eccentric cams 250 are coaxial with the rear wheel 112, and rotation of each second rotary eccentric cam 252 selectively expands one of the rear expandable elements 230, 232 based on the turning direction of the vehicle 100. Rear linear actuators 258 can be connected to the second rotary eccentric cams 252 to independently rotate the second rotary eccentric cams 252. Each rear linear actuator 258 can include a control circuit (not shown) that controls the rear linear actuator 258 based on a command from the control device 130. The control circuit can monitor the extension/retraction amount of the rear linear actuator 258 by an extension/retraction sensor (not shown) and output the detected extension/retraction amount to the control device 130. The control circuit stops the extension/retraction of the rear linear actuator 258 as instructed by the control device 130. According to this aspect, the first and second rotary eccentric cams 250, 252 selectively augment the respective front wheel 110 and rear wheel 112, can accommodate better slow speed operation of the vehicle, and cabin design can be simplified relative to the center pivot design of FIGS. 1 and 2.

Figure 5:
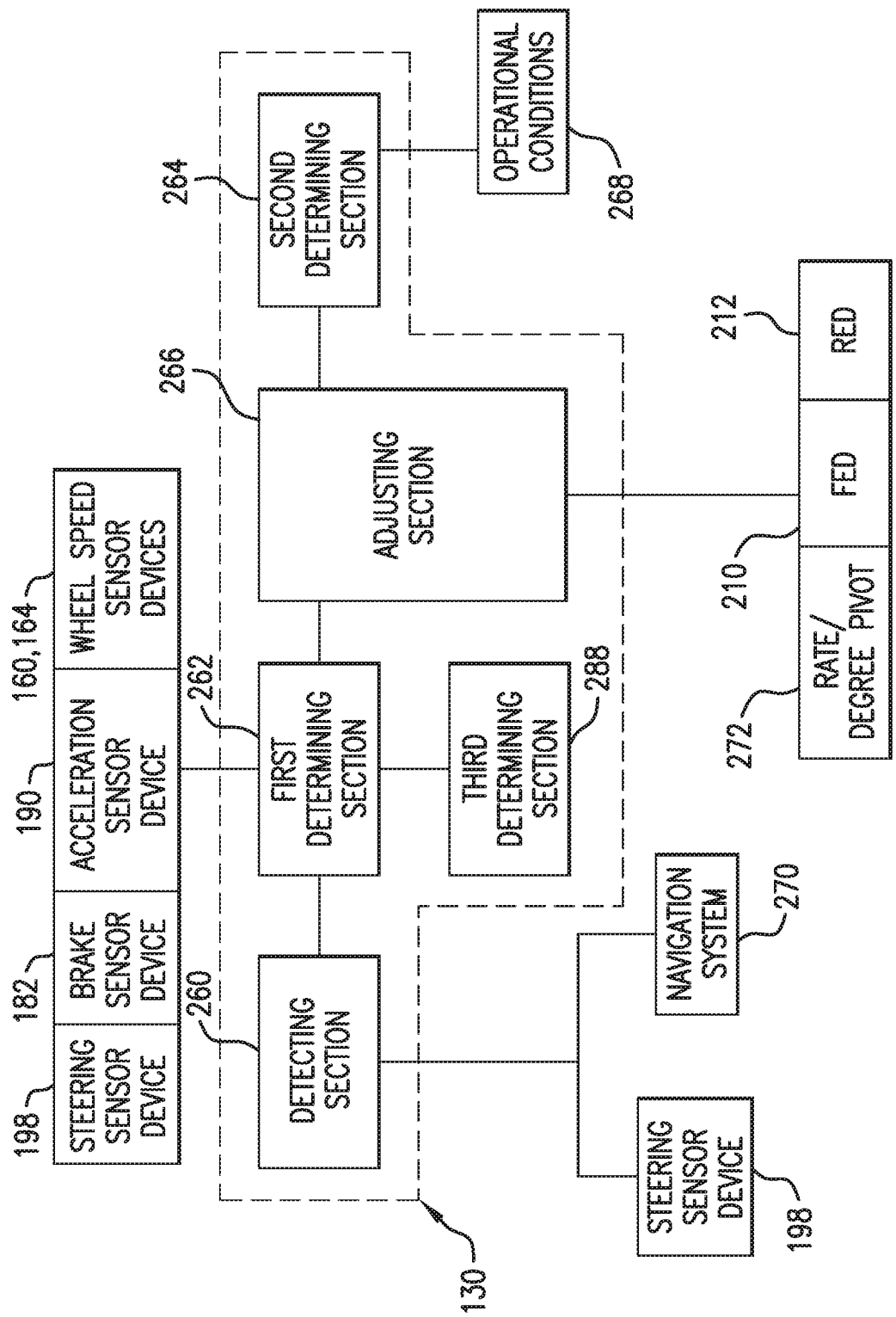
FIG. 5 is a block diagram of a control device of the vehicle control systems.

FIG. 5 is a block diagram that shows an electrical configuration of the control device 130 which controls the components of the above configured vehicle 100. It should be appreciated that any suitable controller and/or electronic control unit which acts to receive the desired inputs and calculate the desired outputs may be employed for the control device 130. It should be further appreciated by one skilled in the vehicle control arts that the control device 130 (and the electric power control unit 122) can be formed from a microcomputer or processor including a random access memory (RAM), a read only memory (ROM), a central processing unit (CPU), and an I/O interface (none are illustrated), wherein the control device 130 (and the electric power control unit 122) executes software implemented functions to control operation of the vehicle 100. The CPU is a processor that controls the above described components of the vehicle 100. The ROM is a non-rewritable nonvolatile memory for storing control programs (for example, a program of a slip prevention process) executed by the CPU, fixed value data, and the like. The RAM is a memory for rewritably storing various pieces of data during execution of the control programs. It should be further appreciated that insofar as the control device 130 is disclosed as a singular microcomputer or processor the control device 130 may be composed of several processors or controllers. Further still, it is also to be appreciated that the control device 130 may include various other modules or components configured to perform other vehicle control related functions.

According to one aspect, the exemplary control device 130 includes a detecting section 260 that detects the turning condition of the vehicle; a first determining section 262 that, when the turning condition is detected, determines a rate of turn and a degree of turn; a second determining section 264 that determines operational conditions 268 of the vehicle; and an adjusting section 266 that, when the rate and degree of turn is determined by the first determining section 262 and when the operational conditions of the vehicle are determined by the second determining section 264, actuates one of the front expansion device 210 and rear expansion device 212 to selectively expand (and change the shape of) the respective one of the front wheel 110 and rear wheel 112 and articulates at 272 a rate and degree of pivot for the vehicle. The detecting section 260 is in signal communication with at least one of the steering sensor device 198 (which again measures steering wheel position angle and rate of turn), and a vehicle navigation system 270, if provided on the vehicle 100. The first determining section 262 is in signal communication with at least one of the steering sensor device 198, the brake sensor device 182, the accelerator pedal sensor device 190 and the front and rear wheel speed sensor devices 160, 164.

According to one aspect, the operational conditions of the vehicle 100 determined by the second determining section 264 include one of vehicle weight, vehicle center of gravity, ground angle relative to each of the front wheel and rear wheel, and drive motor torque. Accordingly, the second determining section 264 is in signal communication with a vehicle weight sensor device 276, a vehicle center of gravity sensor device 278, the front and rear ground angle sensor devices 156, 158, and the drive motor torque sensor device 142. Further operational conditions can include ambient temperature as detected by a temperature sensor device 280 and other atmospheric conditions (e.g., humidity, wind velocity and direction, and the like) as detected by atmospheric sensor device 284. It should be appreciated that each of the vehicle weight sensor device 276, the vehicle center of gravity sensor device 278, the temperature sensor device 280 and the atmospheric sensor device 284 can include a processing circuit (not shown) that processes the results of detection and outputs the processed results to the second determining section 264 of the control device 130. The second determining section 264 further determines whether one of the front wheel 110 and the rear wheel 112 is in a slip condition relative to the other of the front wheel 110 and rear wheel 112.

According to the present embodiment, the control device 130 further includes a third determining section 288 that determines a rate of pivot and degree of pivot of the front frame part 104 relative to the rear frame part 106 based on the determined rate and degree of turn. A sensor device (not shown) can be provided to detect movement of the front frame part 104 relative to the rear frame part 106, and can include a processing circuit (not shown) that processes the results of detection and outputs the processed results to the third determining section 288 of the control device 130. It should be appreciated that actuation of one of the front expansion device 210 and rear expansion device 212 by the adjusting section 266 of the control device 130 is at least partially dependent on the determined rate and degree of pivot of the vehicle frame 102.

Figure 6:
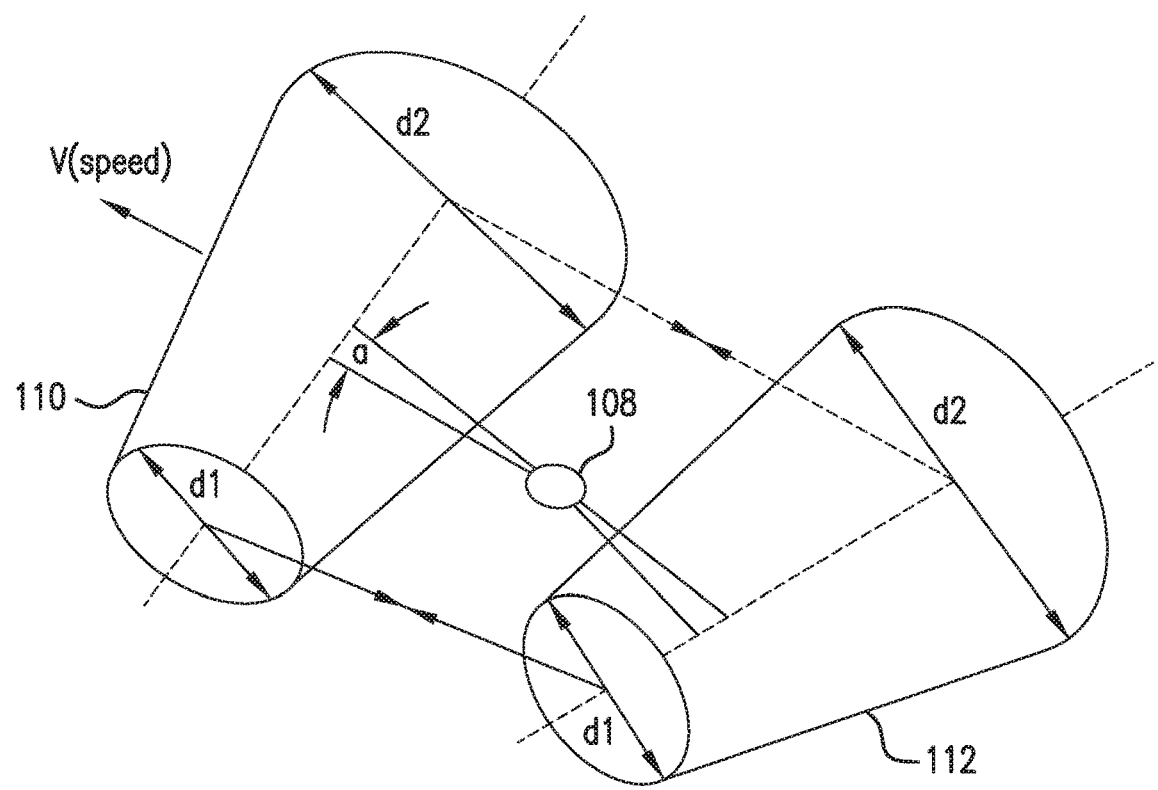
FIGS. 6 and 7 are schematic illustrations of the vehicle in a turning condition.
Figure 7:
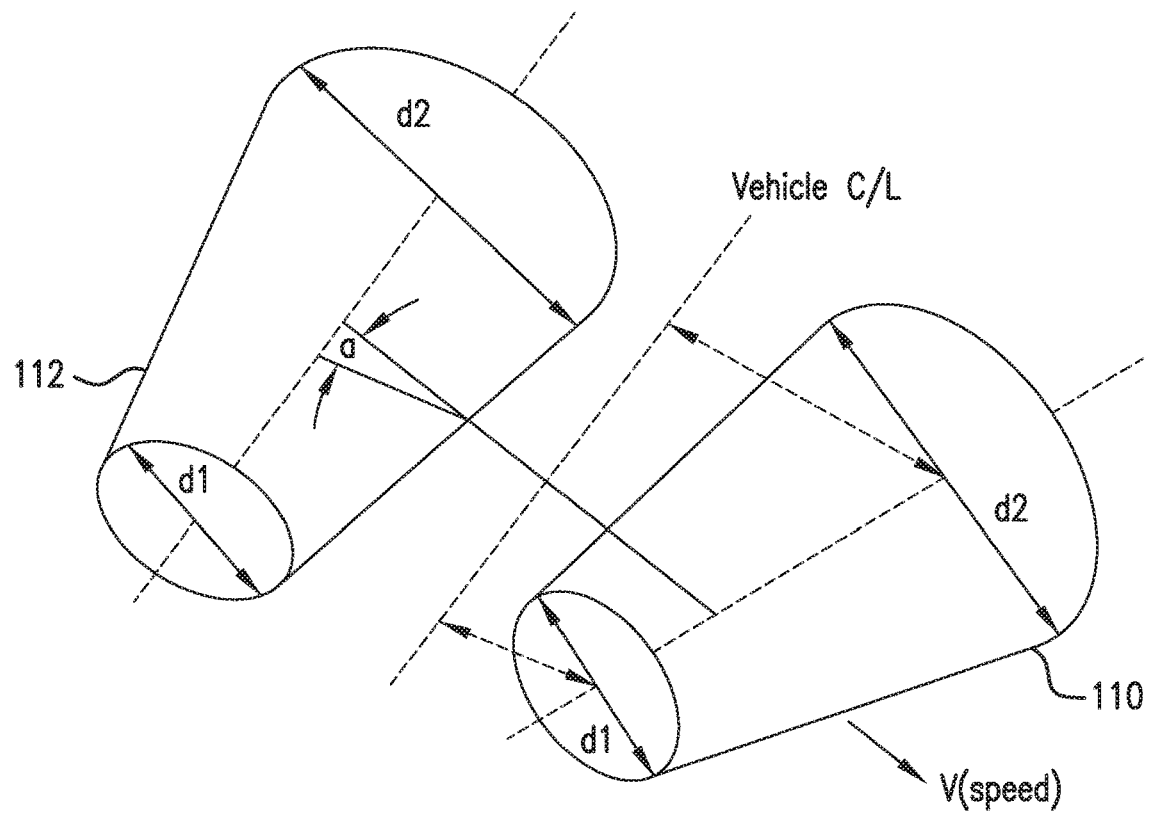

FIGS. 6 and 7 are schematic illustrations of the vehicle 100 in a turning condition wherein the front and rear wheels 110, 112 are linked together mechanically and electronically to provide a smooth and effective turning capability. The main directional change of the vehicle 100 is through changes in the front wheel end diameter shape and the rear wheel end diameter shape via the respective front and rear expansion devices 210, 212 described above. In FIG. 6, the center pivot or front articulation design of the vehicle frame 102 facilitates vehicle turning (i.e., pivot angle). The front and rear frame parts 104, 106 (and, in turn, the front and rear wheels 110, 112) pivot in the center 108 of the vehicle frame 102 to accommodate for the change in the turning radius. In FIG. 7, the frame 102 is not a split frame (i.e., separate front and rear frame parts) like FIG. 6, and the changes in the front and rear wheel end diameter shape via the front and rear expansion devices 210, 212 is relative to the vehicle center lines. According to each aspect, the tapered front and rear wheels 110, 112 allow a gentle banking feeling in a turning condition of the vehicle 100. In addition, the large traction surface of the front and rear wheels 110, 112 minimize wheel spin, and vehicle height can be lowered for easy access.

As is evident from the foregoing, the present disclosure provides a method of controlling the vehicle 100 which has a single front wheel 110 rotatably connected to a front frame part and a single rear wheel 112 rotatably connected to a rear frame part. The method comprises detecting a turning condition of the vehicle 100; determining a rate of turn and a degree of turn associated with the detected turning condition of the vehicle 100; determining operational conditions of the vehicle 100; and when the rate and degree of turn is determined by the first determining section and when the operational conditions of the vehicle 100 are determined by the second determining section, actuating one of a front wheel expansion device 210 and a rear expansion device 212 housed within the respective front wheel 110 and rear wheel 112 to selectively expand the respective one of the front wheel 110 and rear wheel 112 to change a shape of the respective one of the front wheel 110 and rear wheel 112 from a cylindrical shape in top view to a frustoconical shape in top view.

According to one aspect, the rear frame part 106 is separate from and pivotally connected to the front frame part 104, and the exemplary method further includes determining a rate of pivot and degree of pivot of the front frame part 104 relative to the rear frame part 106 based on the determined rate and degree of turn, and the step of actuating one of the front expansion device 210 and rear expansion device 212 is at least partially dependent on the determined rate and degree of pivot.

It will be appreciated that the above-disclosed features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A vehicle comprising:
a frame including a front frame part and a rear frame part;
a single front wheel rotatably connected to the front frame part;
a single rear wheel rotatably connected to the rear frame part,
wherein each of the front wheel and the rear wheel is adapted to have a cylindrical shape in top view when the vehicle is traveling in a straight direction, and each of the front wheel and the rear wheel is adapted to expand and have a frustoconical shape in top view in a turning condition of the vehicle,
wherein the front wheel includes opposite end portions, the front wheel is configured to house a front expansion device adapted to selectively expand one of the opposite end portions of the front wheel based on the turning direction of the vehicle, and
the rear wheel includes opposite end portions, the rear wheel is configured to house a rear expansion device adapted to selectively expand one of the opposite end portions of the rear wheel based on the turning direction of the vehicle; and
a control device operably associated with each of the front expansion device and rear expansion device, the control device including:
a detecting section that detects the turning condition of the vehicle,
a first determining section that, when the turning condition is detected, determines a rate of turn and a degree of turn,
a second determining section that determines operational conditions of the vehicle, and
an adjusting section that, when the rate and degree of turn is determined by the first determining section and when the operational conditions of the vehicle are determined by the second determining section, actuates one of the front expansion device and rear expansion device to selectively expand the respective one of the front wheel and rear wheel.

2. The vehicle of claim 1, wherein the operational conditions of the vehicle include one of vehicle weight, vehicle center of gravity, ground angle relative to each of the front wheel and rear wheel, and drive motor torque.

3. The vehicle of claim 1, wherein the second determining section determines whether one of the front wheel and the rear wheel is in a slip condition relative to the other of the front wheel and rear wheel.

4. The vehicle of claim 1, wherein the control device further includes a third determining section that determines a rate of pivot and degree of pivot of the front frame part relative to the rear frame part based on the determined rate and degree of turn, and actuation of one of the front expansion device and rear expansion device by the adjusting section is at least partially dependent on the determined rate and degree of pivot.

5. The vehicle of claim 1, wherein the rear frame part is separate from and pivotably connected to the front frame part at a single pivot point.

6. The vehicle of claim 1, wherein the front wheel include laterally spaced front expandable elements, and the front expansion device is configured to selectively expand one of the front expandable elements, and the rear wheel include laterally spaced rear expandable elements, and the rear expansion device is configured to selectively expand one of the rear expandable elements.

7. The vehicle of claim 6, wherein one of the front expansion device and rear expansion device is an expansion mandrel provided with at least one actuator adapted to selectively expand opposite end portions of the mandrel.

8. The vehicle of claim 6, wherein one of the front expansion device and rear expansion device includes first and second rotary eccentric cams provided at the opposite end portions of the respective one of the front wheel and rear wheel, wherein rotational axes of the first and second eccentric cams are coaxial with a rotational axis of the respective one of the front wheel and rear wheel.

9. A control device for a vehicle having a single front wheel rotatably connected to a front frame part and a single rear wheel rotatably connected to a rear frame part, the control device comprising:

a detecting section that detects a turning condition of the vehicle;

a first determining section that, when the turning condition is detected, determines a rate of turn and a degree of turn;

a second determining section that determines operational conditions of the vehicle; and an adjusting section that, when the rate and degree of turn is determined by the first determining section and when the operational conditions of the vehicle are determined by the second determining section, actuates one of a front wheel expansion device and a rear expansion device housed within the respective front wheel and rear wheel to selectively expand the respective one of the front wheel and rear wheel to change a shape of the respective one of the front wheel and rear wheel from a cylindrical shape in top view to a frustoconical shape in top view.

10. The vehicle control device of claim 9, wherein the operational conditions of the vehicle include one of vehicle weight, vehicle center of gravity, ground angle relative to each of the front wheel and rear wheel, and drive motor torque.

11. The vehicle control device of claim 9, wherein the second determining section determines whether one of the front wheel and the rear wheel is in slip condition relative to the other of the front wheel and rear wheel.

12. The vehicle control of claim 9, wherein the rear frame part is separate from and pivotally connected to the front frame part, and further including a third determining section that determines a rate of pivot and degree of pivot of the front frame part relative to the rear frame part based on the determined rate and degree of turn, and actuation of one of the front expansion device and rear expansion device by the adjusting section is at least partially dependent on the determined rate and degree of pivot.

13. The vehicle control of claim 9, wherein each of the front expansion device and the rear expansion device is one of an expansion mandrel and at least one rotary eccentric cam.

14. A method of controlling a vehicle, the vehicle having a single front wheel rotatably connected to a front frame part and a single rear wheel rotatably connected to a rear frame part, the method comprising:

detecting a turning condition of the vehicle;

determining a rate of turn and a degree of turn associated with the detected turning condition of the vehicle;

determining operational conditions of the vehicle; and when the rate and degree of turn is determined by the first determining section and when the operational conditions of the vehicle are determined by the second determining section, actuating one of a front wheel expansion device and a rear expansion device housed within the respective front wheel and rear wheel to selectively expand the respective one of the front wheel and rear wheel to change a shape of the respective one of the front wheel and rear wheel from a cylindrical shape in top view to a frustoconical shape in top view.

15. The method of claim 14, the rear frame part is separate from and pivotally connected to the front frame part, and further including determining a rate of pivot and degree of pivot of the front frame part relative to the rear frame part based on the determined rate and degree of turn, wherein the step of actuating one of the front expansion device and rear expansion device is at least partially dependent on the determined rate and degree of pivot.

* * * * *